United States Patent
Usuda et al.

(10) Patent No.: US 6,742,868 B2
(45) Date of Patent: Jun. 1, 2004

(54) RECORDING APPARATUS AND DATA CONTROL METHOD THEREIN

(75) Inventors: Hidenori Usuda, Nagano (JP); Koichi Otsuki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/756,881

(22) Filed: Jan. 10, 2001

(65) Prior Publication Data

US 2001/0019342 A1 Sep. 6, 2001

Related U.S. Application Data

(63) Continuation-in-part of application No. PCT/JP00/03030, filed on May 11, 2000.

(30) Foreign Application Priority Data

May 12, 1999 (JP) ........................................ P. 11-131288

(51) Int. Cl.$^7$ ................................................. B41J 2/21
(52) U.S. Cl. .............................. 347/43; 347/9; 347/15; 347/19
(58) Field of Search ............................... 347/43, 9, 15, 347/19; 358/426.01, 1.16

(56) References Cited

U.S. PATENT DOCUMENTS

| | | | | |
|---|---|---|---|---|
| 5,570,118 A | * | 10/1996 | Rezanka et al. | ............... 347/43 |
| 5,937,152 A | * | 8/1999 | Oda et al. | ............... 395/115 |
| 6,149,263 A | * | 11/2000 | Nakano | ........................ 347/43 |
| 6,290,334 B1 | * | 9/2001 | Ishinaga et al. | ............... 347/59 |

FOREIGN PATENT DOCUMENTS

| | | | |
|---|---|---|---|
| JP | 58-179655 | 10/1983 | ............. B41J/3/04 |
| JP | 1-133743 | 5/1989 | ............. B41J/3/00 |
| JP | 1-99632 | 7/1989 | ............. B41J/3/04 |
| JP | 3-290272 | 12/1991 | ............. B41J/2/525 |
| JP | 4-189160 | 7/1992 | ............. B41J/2/525 |
| JP | 5-254148 | 10/1993 | ............. B41J/2/175 |
| JP | 8-324039 | 12/1996 | ............. B41J/5/30 |
| JP | 9-85967 | 3/1997 | ............. B41J/2/21 |
| JP | 9-169131 | 6/1997 | ............. B41J/2/325 |
| JP | 9-290520 | 11/1997 | ............. B41J/2/21 |

* cited by examiner

*Primary Examiner*—Hai Pham
*Assistant Examiner*—Lam S Nguyen
(74) *Attorney, Agent, or Firm*—Sughrue Mion, PLLC

(57) ABSTRACT

In an ink jet recording apparatus 1, a fixing signal output section 461 outputs a signal indicating that no ink drop is jetted as a mode fixing signal SP to a head driver circuit 50 for nozzle orifices 111 belonging to the group not used for recording, and a mode fixing circuit 18 of the head driver circuit 50 fixes the nozzle orifices belonging to the corresponding group to a condition of jetting no ink drops based on the mode fixing signal SP. Therefore, serial conversion and serial transfer of the data indicating that no ink is jetted ("0" data) as record data SI need not be executed for the group of jetting no ink drops, so that fruitless processing time can be eliminated.

21 Claims, 13 Drawing Sheets

RECORDING APPARATUS AND DATA CONTROL METHOD THEREIN

CROSS-REFERENCE TO RELATED APPLICATION

This is a continuation-in-part application of PCT Application No. PCT/JP00/03030 filed on May 11, 2000.

BACKGROUND OF THE INVENTION

This invention relates to a recording apparatus and a data control method therein, and more particularly to a data control technique for driving dot formation means in the recording apparatus.

In a recording apparatus such as a serial printer of impact dot type, thermal transfer type, etc., or a page printer of laser type, thermal transfer type, etc., for example, in an ink jet printer, a recording head is provided with dot formation means comprising a plurality of nozzle orifices, pressure generating chambers communicating with the nozzle orifices in a one-to-one correspondence, and pressure generating elements such as piezoelectric vibrators for pressurizing ink in the pressure generating chambers, thereby jetting ink drops from the corresponding nozzle orifices and a head driver circuit (drive means) comprising a plurality of switching elements for determining whether or not a drive signal is to be applied to the pressure generating elements based on record data, and ink drops are selectively jetted from predetermined nozzle orifices depending on which of the switching elements are driven, whereby predetermined recording is executed on a medium such as recording paper. Such record data is provided by expanding record information input from a printer driver in memory, as described with reference to FIG. 6.

In FIG. 6, record information created with a printer driver 96 installed in a personal computer is input to a printer via various interfaces for each page (step ST10). At this time, the one-page record information is stored as data in an input buffer 44A formed in DRAM (Dynamic Random Access Memory) by automatically switching the interfaces (step ST20). Next, a control section (CPU) executes command analysis on the data stored in the input buffer 44A one byte at a time and determines whether the data is record data or a record processing command (step ST30).

Next, the control section transfers the record data undergoing the command analysis to an image buffer 44B (first storage means) in the DRAM as image data (step ST40).

The image buffer 44B is configured corresponding to the head structure; for example, in a four-color printer comprising 96 nozzles per row, a recording head 10 is formed with nozzle orifices belonging to five groups (five rows) and thus the image buffer 44B is formed for as much as the five groups. The term "nozzle orifices belonging to five groups" mentioned here refers to nozzle orifices belonging to three color groups for jetting three color inks of cyan (C), magenta (M), and yellow (Y), nozzle orifices belonging to a first black group (BK1) for jetting black ink on the monochrome recording and stopping jetting ink drops on the color recording, and nozzle orifices belonging to a second black group (BK2) for jetting black ink on the color recording and on the monochrome recording.

For example, one-pass data of nozzle #1 corresponding to the yellow (Y) group is transferred to the image buffer 44B in a raster direction (in the order of a, b, c) and after the data transfer concerning the nozzle #1 terminates, similar processing is repeated for executing data transfer concerning nozzles #2, #3, . . . #96.

Similar data expansion and transfer are executed for the nozzle orifices corresponding to the magenta (M) group, the cyan (C) group, the first black group (BK1), and the second black group (BK2).

When the image buffer 44B becomes full of the data, data of one word. (a and b rows in the image buffer) is transferred from the image buffer 44B to an output buffer 44C (second storage means) formed of SRAM (Static Random Access Memory) of a head control unit (step ST50). To do this, first the zeroth bit of one word is converted from raster into row from #1 to #96 and is serially transferred to a head driver circuit (step ST51). This operation is repeated 16 times, whereby one-word transfer is complete (step ST52). Similar transfer is also executed for other four groups. Then, an interrupt is generated and processing for the next one word is performed (step ST53). After this, such processing is repeated.

However, in the recording apparatus in the related art, serial conversion of the record data in the output buffer 44C and serial transfer to the head driver circuit are also executed for the nozzle orifices corresponding to a group jetting no ink drops and thus there is a problem of occurrence of fruitless processing time in the control section. That is, to execute color recording in the ink jet recording apparatus in the related art, serial conversion of the record data in the output buffer 44C and serial transfer to the head driver circuit are executed for all the five groups although recording is executed only with the nozzle orifices corresponding to the three color groups of cyan (C), magenta (M), and yellow (Y) and the nozzle orifices corresponding to the second black group (BK2) and no ink drops are jetted from the nozzle orifices corresponding to the first black group (BK1). Thus, with data indicating that no ink is jetted ("0" data) as record data, serial conversion in the output buffer 44C and serial transfer to the head driver circuit are executed for the first black group (BK1) not used for recording.

To execute monochrome recording in the ink jet recording apparatus in the related art, serial conversion of the record data in the output buffer 44C and serial transfer to the head driver circuit are executed for all the five groups although recording is executed only with the nozzle orifices corresponding to the first black group (BK1) and the nozzle orifices corresponding to the second black group (BK2) and no ink drops are jetted from the nozzle orifices corresponding to cyan (C), magenta (M), yellow (Y). Thus, serial conversion of the data indicating that no ink is jetted ("0" data) in the output buffer 44C as record data and serial transfer of the data indicating that no ink is jetted ("0" data) to the head driver circuit as record data are executed for cyan (C), magenta (M), and yellow (Y) not used for recording.

SUMMARY OF THE INVENTION

It is therefore an object of the invention to provide a recording apparatus and a data control method therein for making it possible to eliminate fruitless processing time and enhance throughput of recording by stopping serial transfer of record data for a group wherein the presence or absence of dot formation is fixed in all dot formation means.

In order to achieve the above object, according to the present invention, there is provided a recording apparatus comprising:

dot formation means being divided into a plurality of groups, each of the groups for forming a dot in accordance with a predetermined dot formation condition assigned thereto;

drive means for driving the respective groups in the dot formation means in accordance with record data;

for expanding record information into an image in storage means and for record data from the storage means to the drive means;

fixing signal output means for outputting a mode fixing signal determining whether the dot is formed or not, and for transmitting the mode fixing signal to the drive means associated with a group in the dot formation means in which whether the dot is formed or not is predetermined as the dot formation condition, instead of the record data;

mode fixing means for fixing the dot formation condition of the group in the dot formation means, to which the mode fixing signal is transmitted, as determined by the mode fixing signal.

In this configuration, drive control is performed based on the mode fixing signal for the group in which whether the dot is formed or not is predetermined in all dot formation means belonging to the same group. The mode fixing signal may be a signal via a hardware signal line or a software command. Thus, serial conversion to the record data and serial transfer of the record data to the drive means become unnecessary for the group subjected to drive control by the mode fixing signal, so that fruitless processing time can be eliminated. Therefore, as compared with the case where serial conversion to the record data and serial transfer of the record data to the head driver circuit are performed for all groups, fruitless data processing time and fruitless data transfer time can be eliminated, so that the throughput of recording can be enhanced.

For example, the fixing signal output means outputs a signal indicating that no dot is formed as the mode fixing signal to the drive means for the dot formation means belonging to the group not used for recording, and the mode fixing means fixes the dot formation means belonging to the corresponding group to a condition of forming no dots based on the mode fixing signal. In such a configuration, the fixing signal output means simply outputs the mode fixing signal for the group wherein no dots are formed in all dot formation means, whereby the mode fixing means fixes the drive condition in hardware assuming that no ink drops are formed for the dot formation means belonging to the group. Thus, serial conversion and serial transfer of the data indicating that no dot is formed ("0" data) as the record data need not be executed for the group of forming no dots, so that fruitless processing time can be eliminated.

In the invention, the storage means may comprise storage regions as many as the maximum number of groups having a possibility that they will be used at the same time or more. In this case, the control means reserves as many storage regions as the number of groups used for the current recording each time in the storage means.

In the invention, only as many storage regions as the maximum number of groups having a possibility that they will be used at the same time may be reserved as the storage means. In this case, the storage regions of the storage means are reserved only for the areas required for the record operation and thus in the control using the record data, the operation of forming dots by the dot formation means in all groups (for example, the flushing operation in an ink jet recording apparatus or the like) becomes impossible. In the invention, however, to form dots by the dot formation means belonging to all groups, if a signal indicating that a dot is formed is output for all groups as the mode fixing signal, ink drops can be jetted from nozzle orifices in all groups if the storage means is short of storage region.

In the invention, when the mode fixing signal is output and transfer of the record data becomes unnecessary and thus an excess storage region occurs in the storage means, preferably the control means uses the excess storage region for serial transfer of the record data.

In the invention, when the mode fixing signal is output and transfer of the record data becomes unnecessary and thus an excess storage region occurs in the storage means, preferably the control means uses the excess storage region for any other processing, such as a communication buffer.

In the invention, the dot formation means may be classified into color groups for a plurality of colors for color recording, a first black group for recording in black on the monochrome recording and stopping dot formation on the color recording, and a second black group for recording in black at both the monochrome recording time and the color recording time. In this case, the fixing signal output means outputs the mode fixing signal for the dot formation means belonging to the first black group on the color recording and outputs the mode fixing signal for the dot formation means belonging to the color groups on the monochrome recording.

In the invention, the fixing signal output means may output a signal indicating that a dot is formed by the dot formation means belonging to all groups to the drive means as the mode fixing signal, and the mode fixing means may fix the dot formation means belonging to all groups to a condition of forming a dot based on the mode fixing signal. In such a configuration, the operation of forming dots in all groups (for example, the flushing operation in an ink jet recording apparatus or the like) is possible if record data is not used.

In the invention, the drive means may comprise a shift register for converting the record data transferred in series into parallel form. In this case, the mode fixing means can fix the dot formation condition for the predetermined group to the condition defined by the fixing signal on a way of a signal transfer path from the shift register to the dot formation means.

In the invention, the drive means may comprise a shift register for converting the record data transferred in series into parallel form. In this case, the mode fixing means may cause the shift register to hold the data defined by the mode fixing signal.

From the viewpoint of a data control method for the invention, this method comprises the steps of:

providing a recording apparatus comprising dot formation means being divided into a plurality of groups, each of the groups for forming a dot in accordance with a predetermined dot formation condition assigned thereto; drive means for driving the respective groups in the dot formation means in accordance with record data; and for expanding record information into an image in storage means and for record data from the storage means to the drive means;

judging whether there is a group of the dot formation means in which whether the dot is formed or not is predetermined as the predetermined dot formation condition, when the record data is expanded in the storage means and is transmitted from the storage means to the drive means;

outputting a mode fixing signal determining whether the dot is formed or not, and transmitting the mode fixing signal to the drive means associated with the group in which whether the dot is formed or not is predetermined, instead of the record data; and fixing the dot formation condition of the group in the dot formation means, to which the mode fixing signal is transmitted, as determined by the mode fixing signal.

In the invention, for example, a signal indicating that no dot is formed as the mode fixing signal is output to the drive means for the dot formation means belonging to the group not used for recording, and the dot formation means belonging to the corresponding group is fixed to a condition of forming no dots based on the mode fixing signal.

In the invention, a storage region may be reserved in the storage means only for the group for which the mode fixing signal is not output and reserving a storage region in the storage means may be skipped for the group for which the mode fixing signal is output.

DETAILED DESCRIPTION OF THE PREFERRED EMBODIMENTS

An ink jet recording apparatus incorporating the invention will be discussed with reference to the accompanying drawings.

Figure 1:
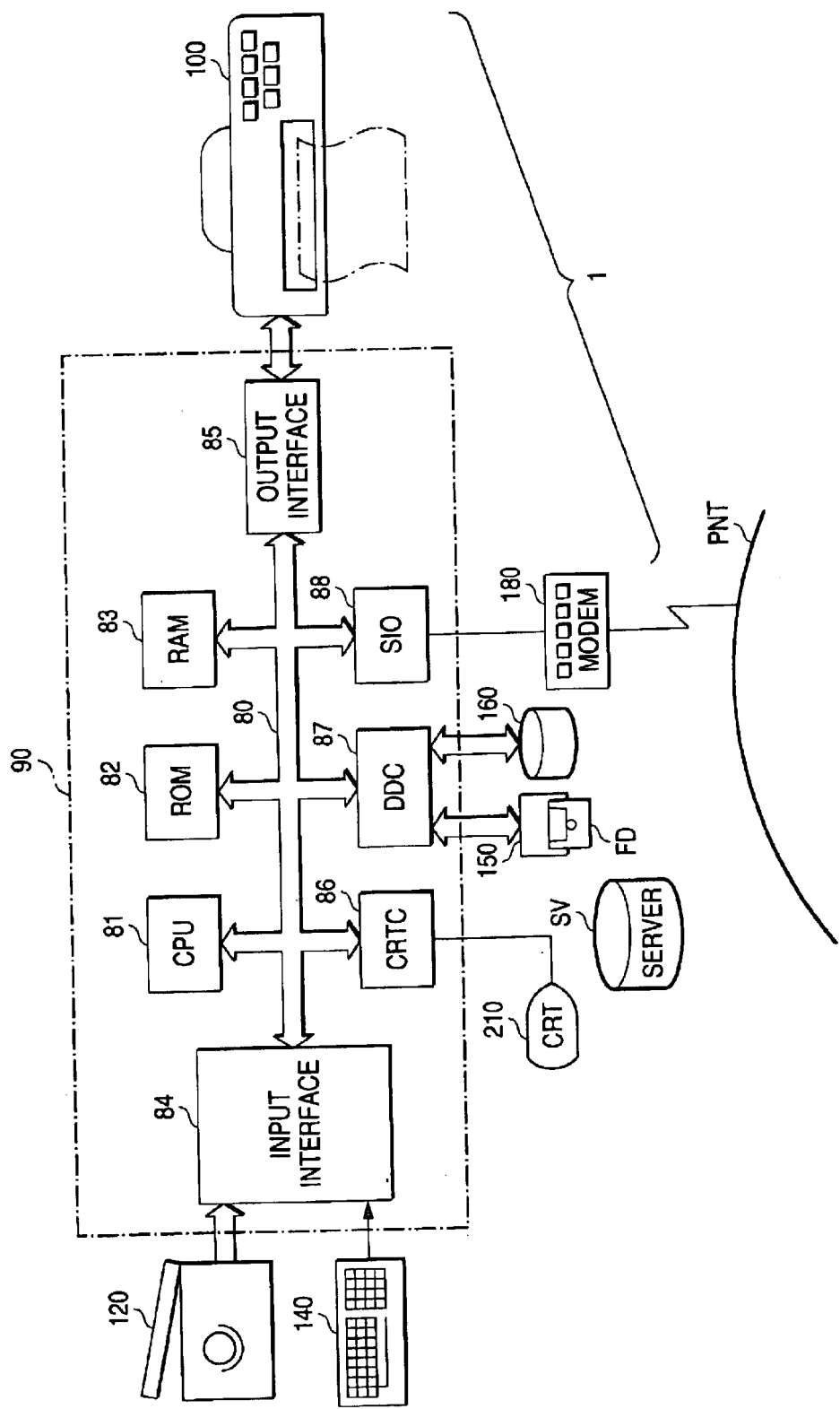
FIG. 1 is a block diagram to show the general configuration of an ink jet recording apparatus incorporating the invention.

FIG. 1 is a block diagram to show the general configuration of an ink jet recording apparatus incorporating the invention.

As shown in FIG. 1, in an ink jet recording apparatus 1 according to one embodiment, a scanner 120 and a color ink jet printer 100 are connected to a computer 90 and a predetermined program is loaded into the computer 90 and is executed, whereby the ink jet recording apparatus 1 serves as a recording apparatus as a whole.

The computer 90 comprises the following members connected by a bus 80, centering on a CPU 81 for executing various types of computation processing to control the operation concerning image processing following the program: ROM 82 previously stores programs and data required for the CPU 81 to execute various types of computation processing and likewise RAM 83 is memory where various programs and data required for the CPU 81 to execute various types of computation processing are temporarily read and written. An input interface 84 is responsible for inputting signals from the scanner 120 and a keyboard 140 and an output interface 85 is responsible for outputting data to the ink jet printer 100. A CRTC 86 controls signal output to a CRT 210 that can produce color display and a disk controller (DDC) 87 controls transfer of data to and from a hard disk 160, a flexible drive 150, or a CD-ROM drive (not shown). Various programs loaded into the RAM 83 for execution, various programs provided in the device driver format, various programs provided in the disk driver format, and the like are stored on the hard disk 160.

In addition, a serial input interface (SIO) 88 is connected to the bus 80. The SIO 88 is connected to a modem 180 and is connected through the modem 180 to a public telephone network PNT. The computer 90 is connected to an external network through the SIO 88 and the modem 180 and can also be connected to a specific server SV, thereby downloading a necessary program for image processing onto hard disk. A necessary program can also be down loaded with flexible disk FD or CD-ROM and be executed by the computer 90.

Figure 2:
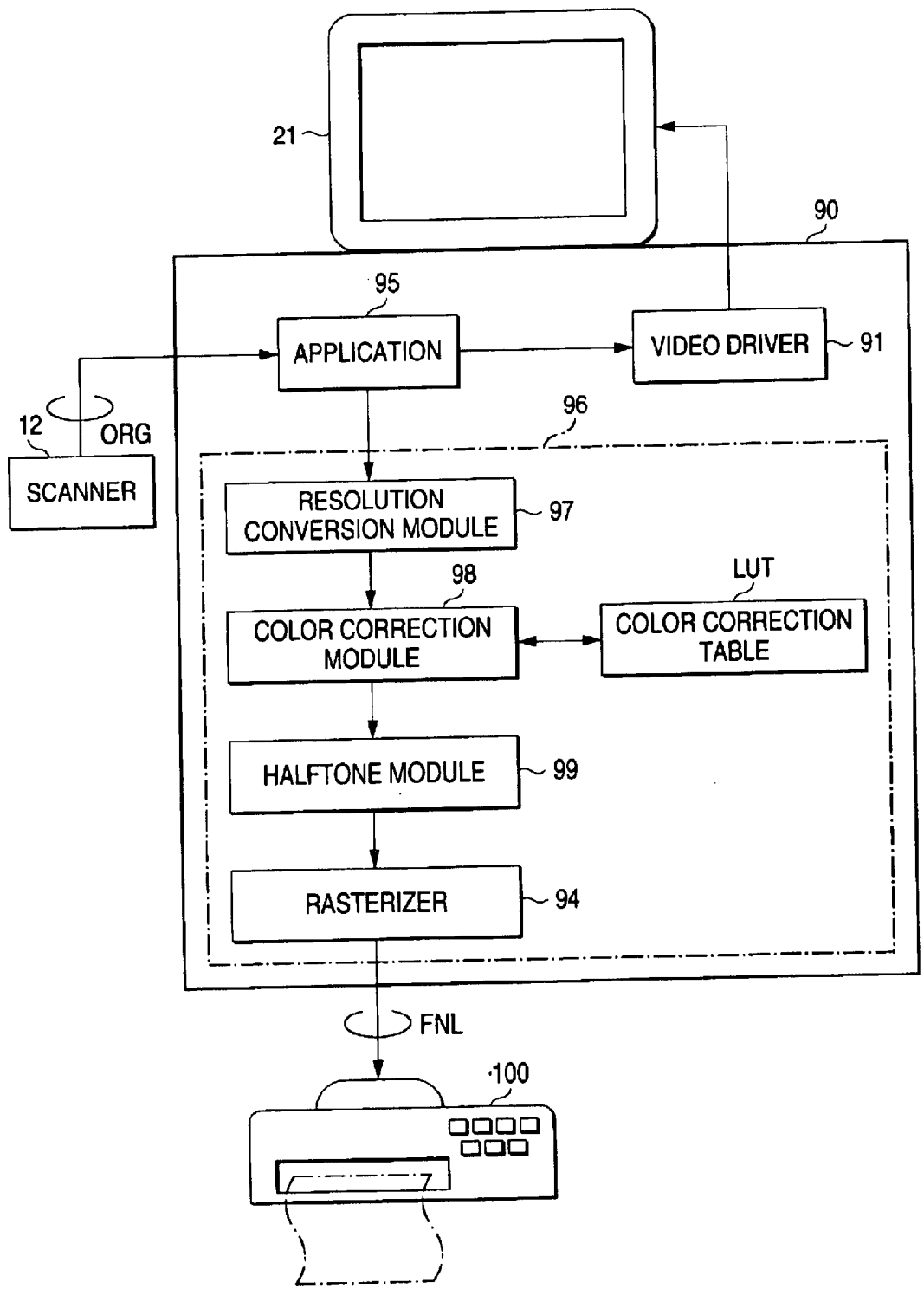
FIG. 2 is a block diagram to show the software configuration of the ink jet recording apparatus shown in FIG. 1.

FIG. 2 is a block diagram to show the software configuration of the ink jet recording apparatus of the embodiment. In the computer 90, an application program 95 operates under a predetermined operating system. A video driver 91 and a printer driver 96 are built in the operating system and intermediate image data to be transferred to the ink jet printer 100 is output through the drivers 91 and 96 from the application program 95. The application program 95 for retouching an image, etc., reads an image from the scanner 12 and performs predetermined processing for the read image, then displays an image on a CRT display 21 through the video driver 91. Data ORG supplied from the scanner 12 is original color image data read from a color original and consisting of three color components of red (R), green (G), and blue (B).

When the application program 95 issues a record instruction, the printer driver 96 of the computer 90 receives image information from the application program 95 and the printer driver 96 converts the image information into signals that can be processed in the ink jet printer 100 (here, signals converted into multilevel for the colors of cyan, magenta, yellow, and black). In the example shown here, the printer driver 96 contains a resolution conversion module 97, a color correction module 98, a color correction table LUT, a halftone module 99, and a rasterizer 94.

The printer driver 96 also serves as stop command means for outputting a stop signal indicating that jetting of ink drops is stopped continuously for a predetermined time for nozzle orifices belonging to a specific group, of a plurality of nozzle orifices, as described later.

The resolution conversion module 97 plays a role in converting the resolution of color image data handled by the application program 95, namely, the number of pixels per unit length into the resolution that can be handled by the printer driver 96. Since the image data thus undergoing the resolution conversion is still image information consisting of three colors of R, G, and B, the color correction module 98 converts the image data into data of each color of cyan (C), magenta (M), yellow (Y), and black (BK) used by the ink jet printer 100 for each pixel while referencing the color correction table LUT. The data thus undergoing color correction has a gradation value in the range of 256 levels of gray, etc., for example. The halftone module 99 executes halftone processing to represent a predetermined gradation value in the ink jet printer 100 by forming dots in a dispersion manner. The image data thus processed is sorted by the rasterizer 94 in the order of data to be transferred to the ink jet printer 100 and is output as final image data FNL (record information).

In the example, the ink jet printer 100 only executes the dot formation in accordance with the image data FNL and does not perform image processing. The printer driver 96 in the computer 90 does not adjust a drive signal in the ink jet printer 100, etc., but can also set a plurality of pulse signals contained in the drive signal using a function of bi-directional communication with the ink jet printer 100.

Figure 3:
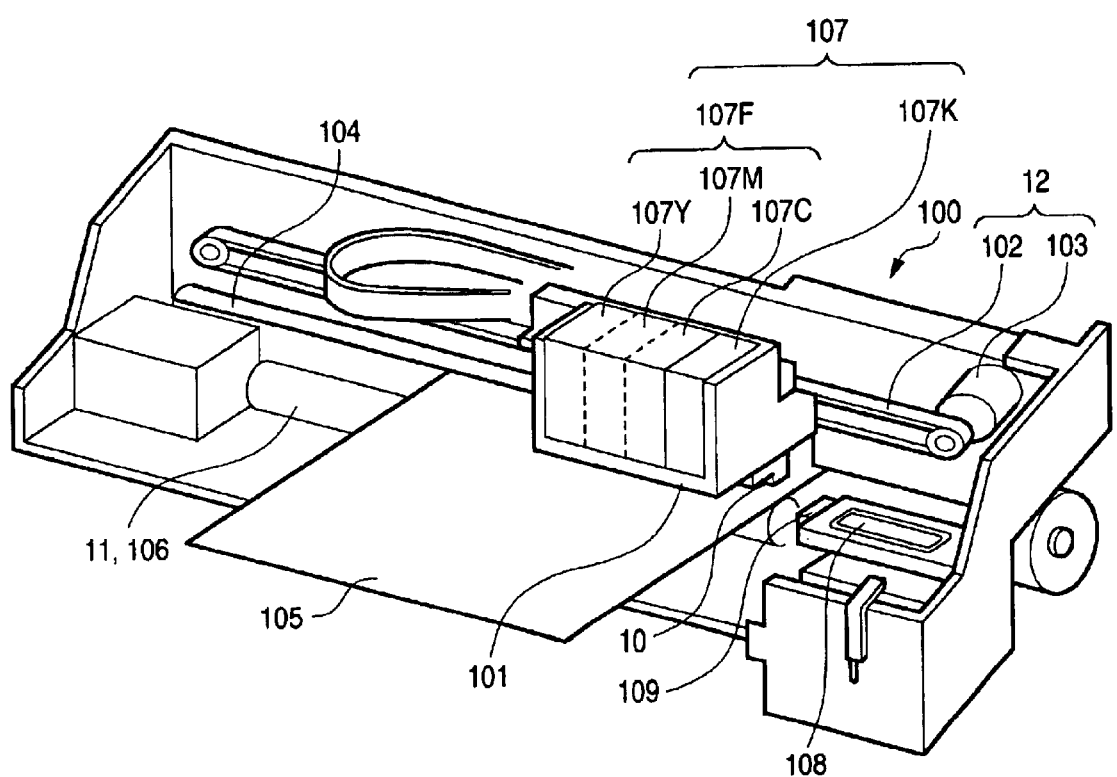
FIG. 3 is a perspective view to show the main part of an ink jet printer used with the ink jet recording apparatus shown in FIG. 1.

FIG. 3 is a perspective view to show the main part of the ink jet printer.

As shown in FIG. 3, in the ink jet printer 100, a carnage 101 is connected to a carriage motor 103 of a carriage mechanism 12 via a timing belt 102 and is guided by a guide member 104 so as to reciprocate in the paper width direction of recording paper 105. The ink jet printer 100 is formed with a paper transport mechanism 11 using a paper transport roller 106. An ink jet recording head 10 is attached to the face of the carriage 101 opposed to the recording paper 105, in the example shown in the figure, the lower face.

The recording head 10 receives supply of ink from two ink cartridges 107K and 107F placed on the carriage 101 and jets ink drops on the recording paper 105 to form dots as the carriage 101 is moved, thereby recording an image and character on the recording paper 105. From the ink cartridge 107K, stored black (Bk) ink is supplied to the recording head 10. On the other hand, the ink cartridge 107F is provided for color ink and is formed with a plurality of ink storage sections 107C, 107M, and 107Y for storing color inks. Cyan (C) ink, magenta (M) ink, and yellow (Y) ink are stored in the ink storage sections 107C, 107M, and 107Y separately and are supplied to the recording head 10 separately.

A capping unit 108 is formed in a non-storage region of the ink jet printer 100 and seals the nozzle orifices of the recording head 10 while recording stops. Therefore, an increase in viscosity of ink or formation of an ink film because a solvent is scattered from ink while recording stops can be suppressed. Therefore, the nozzles can be prevented from being clogged while recording stops. The capping unit 108 receives ink drops from the recording head 10 by the flushing operation performed during the record operation. A wiping unit 109 is placed in the proximity of the capping unit 108 and wipes the surface of the recording head 10 with a blade, etc., for wiping out ink leavings and paper powder deposited on the surface of the recording head 10.

Figure 4:
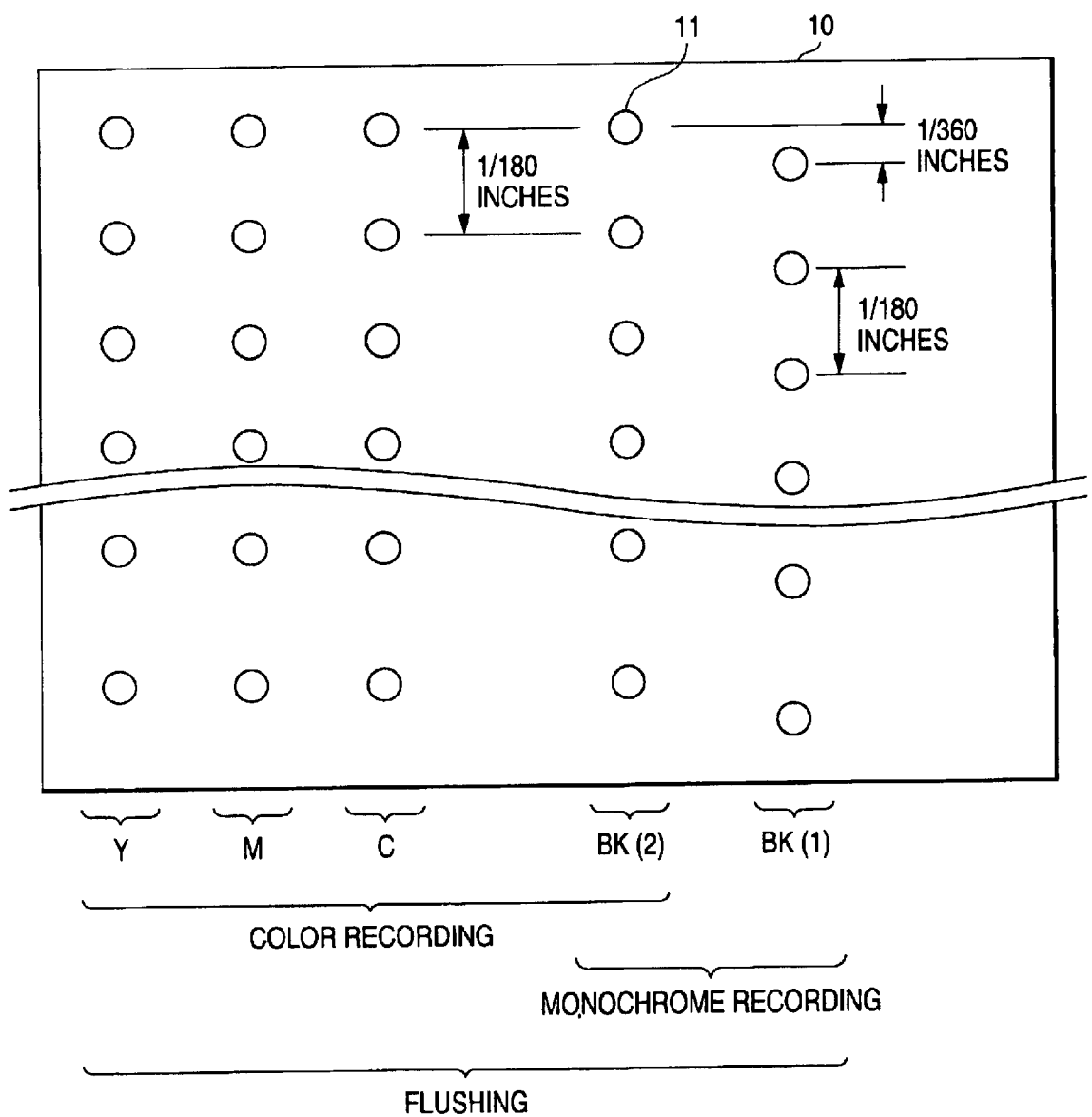
FIG. 4 is a schematic representation to show a nozzle arrangement formed on a recording head shown in FIG. 3.

FIG. 4 is a schematic representation to show a nozzle arrangement formed on the recording head 10 shown in FIG. 3. As seen in the figure, in the ink jet recording apparatus 1 of the invention, the recording head 10 is formed with five rows (five groups) of nozzles 11 and the nozzles 11 are nozzle orifices belonging to three color groups for jetting three color inks of cyan (C), magenta (M), and yellow (Y), nozzle orifices belonging to a first black group (BK1) for jetting black ink on the monochrome recording and stopping jetting ink drops on the color recording, and nozzle orifices belonging to a second black group (BK2) for jetting black ink on the color recording and on the monochrome recording. The nozzle orifices corresponding to cyan (C), magenta (M), yellow (Y), and the second black group (BK2) are arranged on the same lines with spacing of $\frac{1}{180}$ inches; the nozzle orifices belonging to the first black group (BK1) are formed at $\frac{1}{360}$-inch shift positions from the nozzle orifices.

Figure 5:
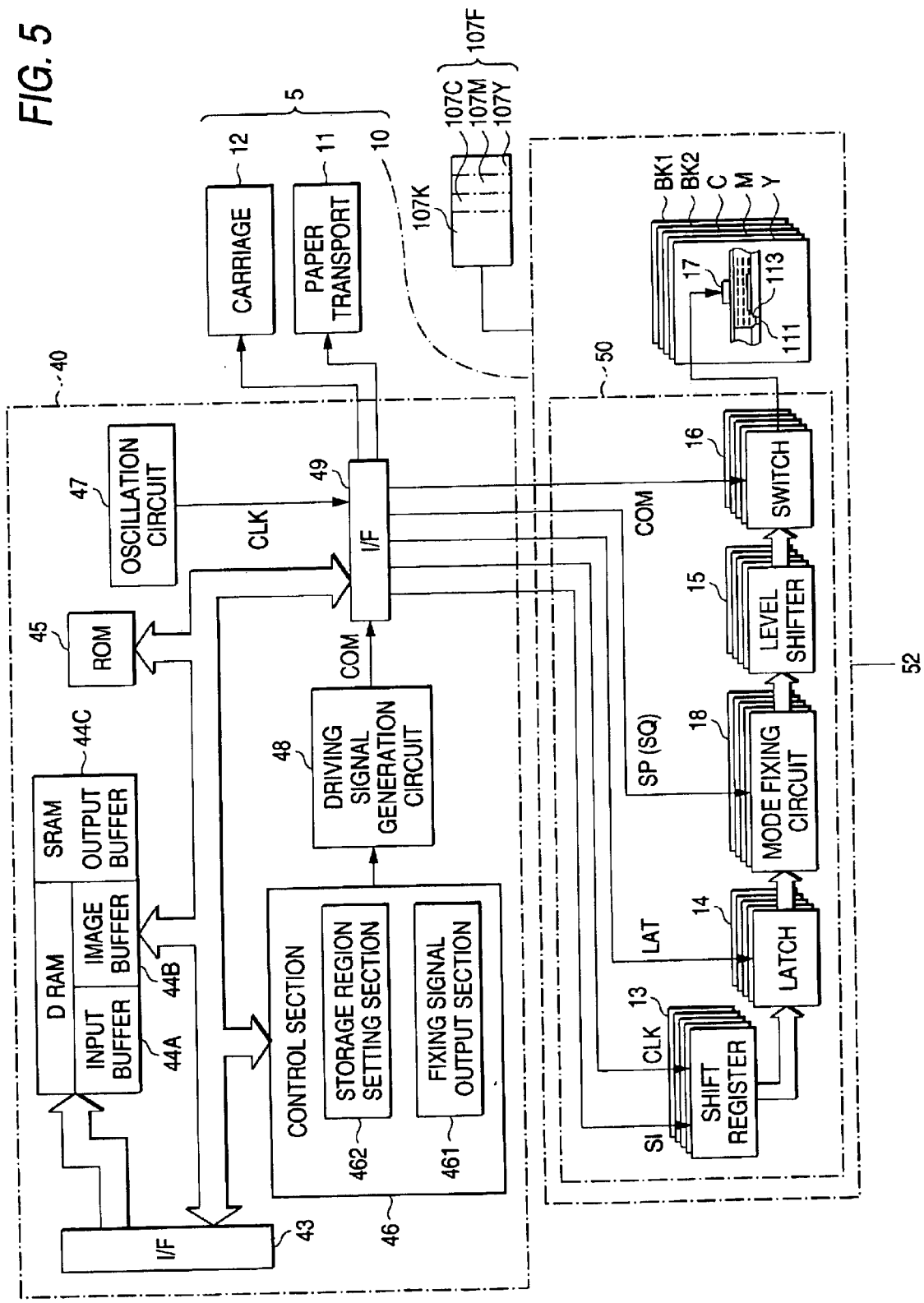
FIG. 5 is a functional block diagram of the ink jet printer shown in FIG. 3.
Figure 6:
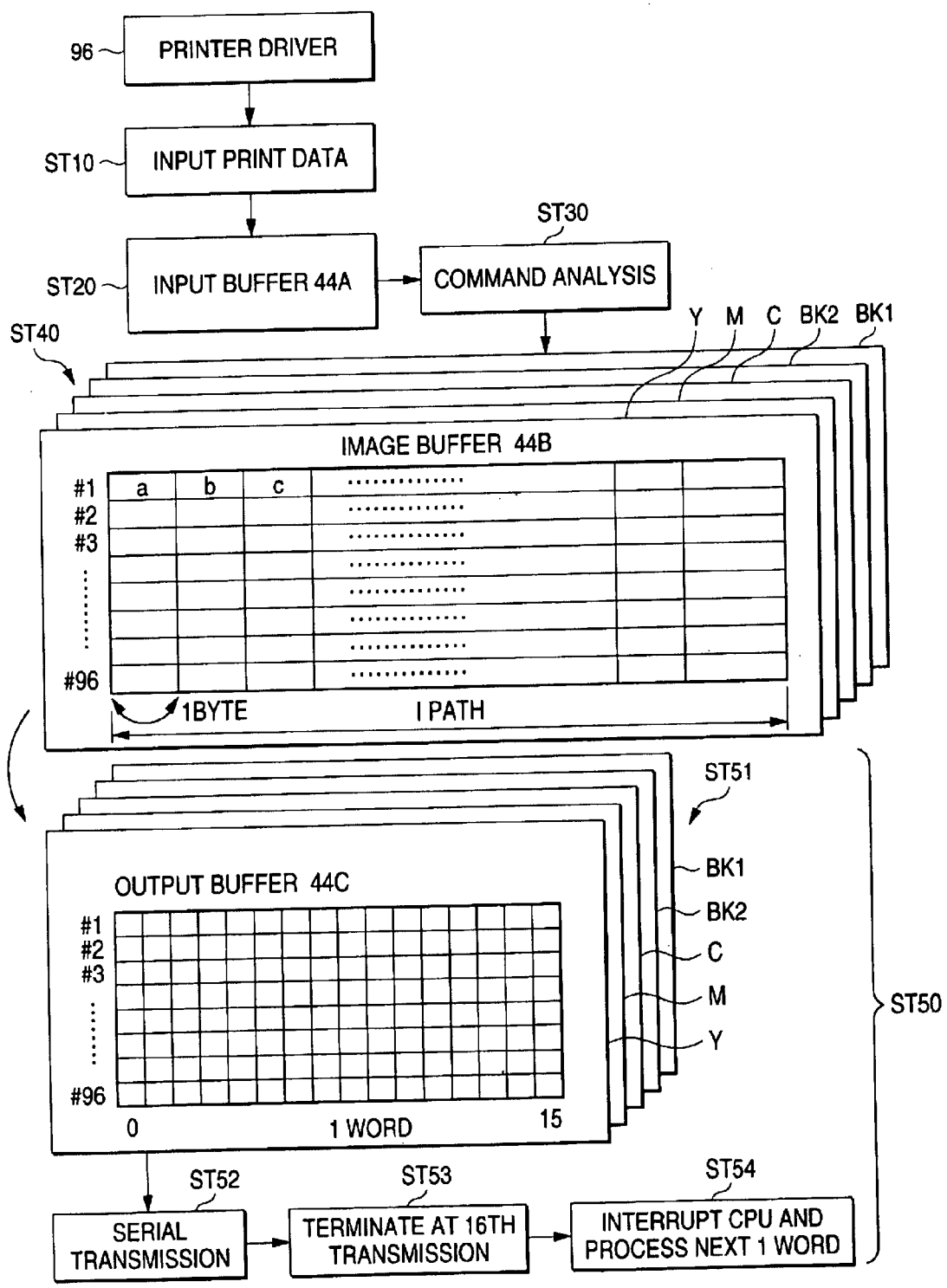
FIG. 6 is a flowchart to show processing of converting record information into record data and serially transferring the record data to a head driver circuit of the recording head in the ink jet printer shown in FIG. 3.
Figure 7:
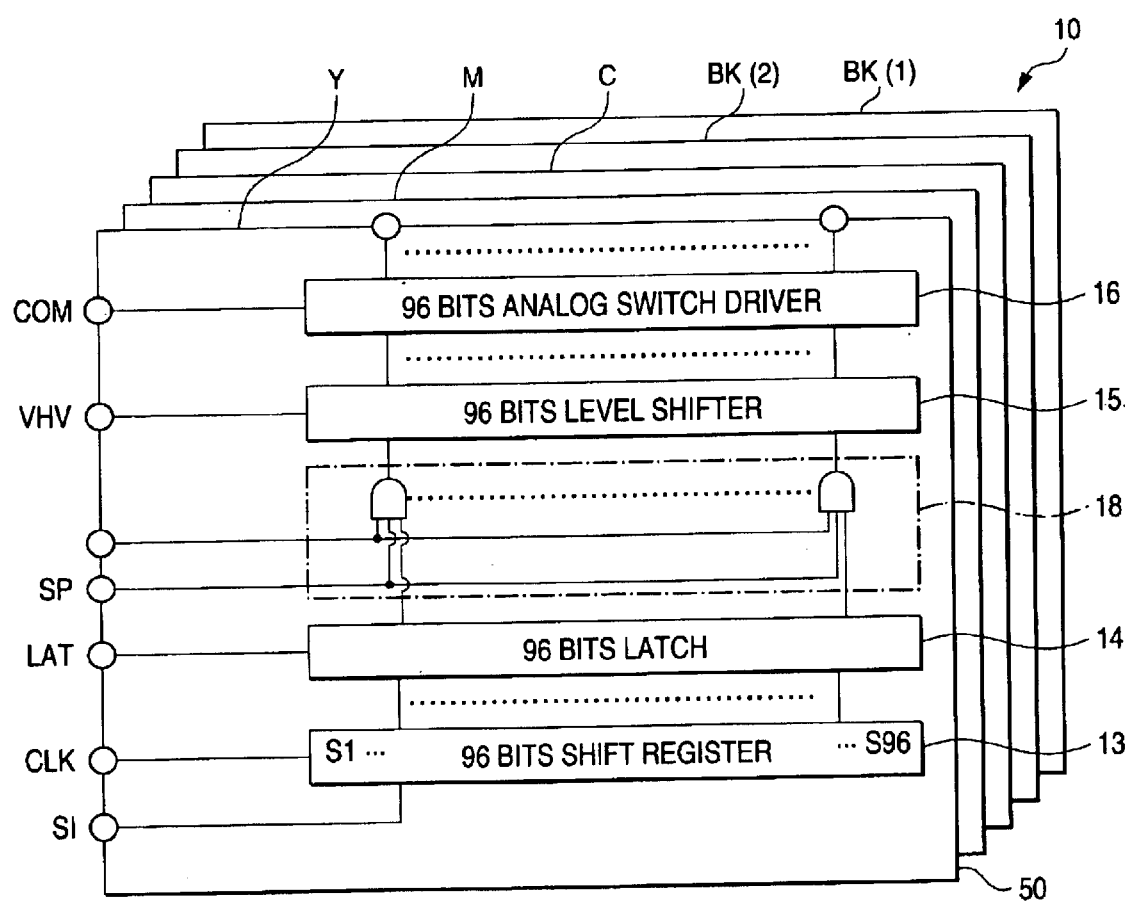
FIG. 7 is a block diagram to show the configuration of the head driver circuit shown in FIG. 5.

FIG. 5 is a functional block diagram of the ink jet printer 100 of the embodiment. FIG. 6 is a schematic representation to show the data processing contents performed in the ink jet printer 100. FIG. 7 is a block diagram of a head driver circuit formed in the recording head 10.

In FIG. 5, the ink jet printer 100 is made up of a print controller 40 and a print engine 5. The print controller 40 comprises an interface 43 for receiving image data FNL (record information) containing multilevel hierarchical information from the computer 90 (see FIGS. 1 and 2) and the like, an input buffer 44A and an image buffer 44B implemented as DRAM for storing various pieces of data such as the record information containing multilevel hierarchical information (first storage means), an output buffer 44C implemented as SRAM (second storage means), ROM 45 storing routines, etc., for performing various types of data processing, a control section 46 implemented as a CPU, etc., an oscillation circuit 47, a drive signal generator circuit 48 for generating a drive signal COM sent to the recording head 10, the drive signal generator circuit 48, and an interface 49 for transmitting print data expanded into dot pattern data and the drive signal to the print engine 5.

The basic operation in the print controller 40 thus configured is similar to that of the ink jet recording apparatus in the related art; as shown in FIG. 6, record information created with the printer driver 96 installed in the personal computer is input to the printer via various interfaces for each page (step ST10). At this time, the one-page record information is stored as data in the input buffer 44A formed in the DRAM by automatically switching the interfaces (step ST20). Next, the control section (CPU) executes command analysis on the data stored in the input buffer 44A one byte at a time and determines whether the data is record data or a record processing command and (step ST30).

Next, the control section transfers the record data undergoing the command analysis to the image buffer 44B (first storage means) in the DRAM as image data (step ST40). The image buffer 44B is also configured corresponding to the head structure; for example, in a four-color printer comprising 96 nozzles per row, the recording head 10 is formed with nozzle orifices belonging to five groups (five rows) and thus the image buffer 44B is also formed for as much as the five groups.

For example, one-pass data of nozzle #1 corresponding to the yellow (Y) group is transferred to the image buffer 44B in a raster direction (in the order of a, b, c) and after the data transfer concerning the nozzle #1 terminates, similar processing is repeated for executing data transfer concerning nozzles #2, #3, . . . #96. Similar data expansion and transfer are executed for the nozzle orifices corresponding to the magenta (M) group, the cyan (C) group, the first black group (BK1), and the second black group (BK2).

When the image buffer 44B becomes full of the data, one-word data is transferred from the image buffer 44B to the output buffer 44C (second storage means) formed of SRAM of head control unit (step ST50). Since the environment of the embodiment is a 32-bit architecture, a and b rows in the image buffer are transferred. To do this, first the zeroth bit of one word is converted from raster into row from #1 to #96 and is serially transferred to a head driver circuit 50 (step ST51). This operation is repeated 16 times, whereby one-word transfer is complete (step ST52). Similar transfer is also executed for other four groups. Then, an interrupt is generated and processing for the next one word is performed (step ST53). After this, such processing is repeated.

FIG. 7 is a block diagram of the head driver circuit formed in the recording head of the ink jet recording apparatus of the embodiment.

Again in FIG. 5, the print engine 5 comprises the recording head 10, the paper transport mechanism 11, and the carriage mechanism 12. The paper transport mechanism 11 is provided for transporting recording media of recording paper, etc., in sequence for subscanning and the carriage mechanism 12 is provided for main scanning of the recording head 10.

The recording head 10 jets ink drops from the nozzle orifices 111 at predetermined timing. The recording head 10 is provided with the head driver circuit 50 comprising a shift register 13, a latch circuit 14, a level shifter 15, and a switching circuit 16, as shown also in FIG. 7.

In FIGS. 5 and 7, record data SI expanded into dot pattern data in the print controller 40 is serially output to the head driver circuit 50 of the recording head 10 via the interface 49 in synchronization with a clock signal CLK from the oscillation circuit 47 and is serially transferred to the shift register 13 of the recording head 10 and is set in sequence. In this case, first the data of the most significant bit in the record data SI of nozzles is serially transferred and if the serial transfer of the data of the most significant bit terminates, the data of the second most significant bit is serially transferred.

Likewise, the data of the low-order bits is serially transferred in sequence. If the record data of the bits for all nozzles is set in the elements of the shift register 13, the control section 46 outputs a latch signal (LAT) to the latch circuit 14 at a predetermined timing. The latch circuit 14 latches the nozzle selection data set in the shift register 13 in response to the latch signal. The nozzle selection data latched by the latch circuit 14 is applied to the level shifter 15 of a voltage converter. For example, if the record data SI is "1," the level shifter 15 converts the data into a voltage value VHV that can be driven by the switching circuit 16, for example, several ten volts.

The record data SI undergoing the conversion is applied to each switching element of the switching circuit 16 and each element is placed in a connection state. Here, a drive signal COM generated by the drive signal generator circuit 48 is applied to each switching element of the switching circuit 16 and when each switching element of the switching circuit 16 is placed in the connection state, the drive signal COM is applied to a pressure generating element 17 connected to the element. Therefore, in the recording head 10, whether or not the drive signal COM is to be applied to the pressure generating element 17 can be controlled based on the nozzle selection data corresponding to the record data SI.

Since the element of the switching circuit 16 is placed in the connection state, for example, in the period during which the nozzle selection data (record data SI) is "1," the drive signal COM can be supplied to the pressure generating element 17 and the pressure generating element 17 is displaced (deformed) by the supplied drive signal COM. Since the element of the switching circuit 16 is placed in a disconnection state in the period during which the record data SI is "0," supplying the drive signal COM to the pressure generating element 17 is shut off. Each pressure generating element 17 holds the immediately preceding charge in the period during which the nozzle selection data (record data SI) is "0," so that the immediately preceding displacement state is maintained.

Here, when a switching element 52 is turned on and the drive signal COM is applied to the pressure generating element 17, a pressure generating chamber 113 communicating with the nozzle orifice 111 is shrunk and ink in the pressure generating chamber 113 is pressurized. At this time, the ink in the pressure generating chamber 113 is jetted as an ink drop, forming a dot on recording paper, etc. That is, in the embodiment, the nozzle orifice 111, the pressure generating chamber 113, and the pressure generating element 17 make up dot formation means.

In the embodiment, the recording head 10 is formed with five rows (five groups) of the nozzle orifices 111 as the nozzle orifices 111 belonging to the three color groups for jetting three color inks of cyan (C), magenta (M), and yellow (Y), the nozzle orifices belonging to the first black ink (BK1) group, and the nozzle orifices belonging to the second black ink (BK2) group, as described above, and the pressure generating chambers 113, the pressure generating elements 17, and the switching elements are formed in a one-to-one correspondence with the nozzle orifices 111. Therefore, the pressure generating chambers 113, the pressure generating elements 17, and the switching elements are also classified into five groups for control. The image buffer 44B and the output buffer 44C previously described with reference to FIG. 6 are also divided into five groups and in the memories, data expansion from record information to record data SI and data conversion are executed for each group.

In the ink jet recording apparatus 1 thus configured, the nozzle orifices 111 used to execute color recording differ from those used to execute monochrome recording. That is, to execute color recording, only the nozzle orifices 111 corresponding to the three color groups of cyan (C), magenta (M), and yellow (Y) and the nozzle orifices 111 corresponding to the second black group (BK2) are used for recording and no ink drops are jetted from the nozzle orifices 111 corresponding to the first black group (BK1). To execute monochrome recording, only the nozzle orifices 111 corresponding to the first black group (BK1) and the nozzle orifices 111 corresponding to the second black group (BK2) are used for recording and no ink drops are jetted from the nozzle orifices 111 corresponding to the three color groups of cyan (C), magenta (M), and yellow (Y). Ink drops are jetted from all nozzle orifices 111 at the flushing operation time.

Then, in the embodiment, hardware drive control with a mode fixing signal described later rather than drive control with the record data SI is performed for the group wherein the ink drop jet mode is fixed in all nozzle orifices 111 belonging to the same group, as described below.

First, in the embodiment, as shown in FIG. 5, the control section 46 is formed with a fixing signal output section 461 for outputting a mode fixing signal SP corresponding to the fix condition in place of the record data SI corresponding to the nozzle orifices 111 to the head driver circuit 50 for the group wherein the ink drop jet mode is fixed in all nozzle orifices 111. The control section 46 is also formed with a storage region setting section 462 for reserving a storage region (buffer area) of the minimum capacity required for the current recording mode, of the five-group storage capacity on the whole in the output buffer 44C. Further, as shown also in FIG. 7, the head driver circuit 50 is formed with a mode fixing circuit 18 for fixing the ink jet condition to the condition defined by the mode fixing signal SP for the nozzle orifices 111 belonging to the corresponding group in the embodiment, output of the latch circuit 14 and the mode fixing signal SP are input to an AND gate, whereby so long as data indicating that no ink is jetted ("0" data) is input to the AND gate as the mode fixing signal SP, the switching elements of the switching circuit 16 are always fixed off in the group.

For example, to execute monochrome recording, the fixing signal output section 461 of the control section 46 outputs a fixing signal, indicating that the jetting mode is fixed to the non-jetting mode, as the mode fixing signal SP for the three color groups of cyan (C), magenta (M), and yellow (Y) not used for recording and thus the data indicating that no ink is jetted ("0" data) is input to the AND gate of the head driver circuit 50. At this time, the storage region setting section 462 of the control section 46 reserves the storage regions (buffer areas) for the two groups of the first black group (BK1) and the second black group (BK2) in the output buffer 44C because serial conversion and serial transfer of the record data SI may be executed only for the first black group (BK1) and the second black group (BK2) required for monochrome recording. In this instance, since the mode fixing signal SP sent to the three color groups is meant to ensure that no ink is jetted (i.e., that the groups are "fixed in place" so as not to print), the mode fixing signal for the three color groups is referred to as a "fixing signal."

In contrast, to execute color recording, the fixing signal output section 461 of the control section 46 outputs a signal indicating that the jetting mode is fixed to the non-jetting mode as the mode fixing signal SP for the first black group (BK1) not used for recording and consequently, the data indicating that no ink is jetted ("0" data) is input to the AND gate of the head driver circuit 50 for the group. At this time, the storage region setting section 462 of the control section 46 reserves the storage regions (buffer areas) for the four groups of the three color groups of cyan (C), magenta (M), and yellow (Y) and the second black group (BK2) in the output buffer 44C because serial conversion and serial transfer of the record data SI may be executed only for the three color groups of cyan (C), magenta (M), and yellow (Y) and the second black group (BK2) required for color recording.

Figure 8:
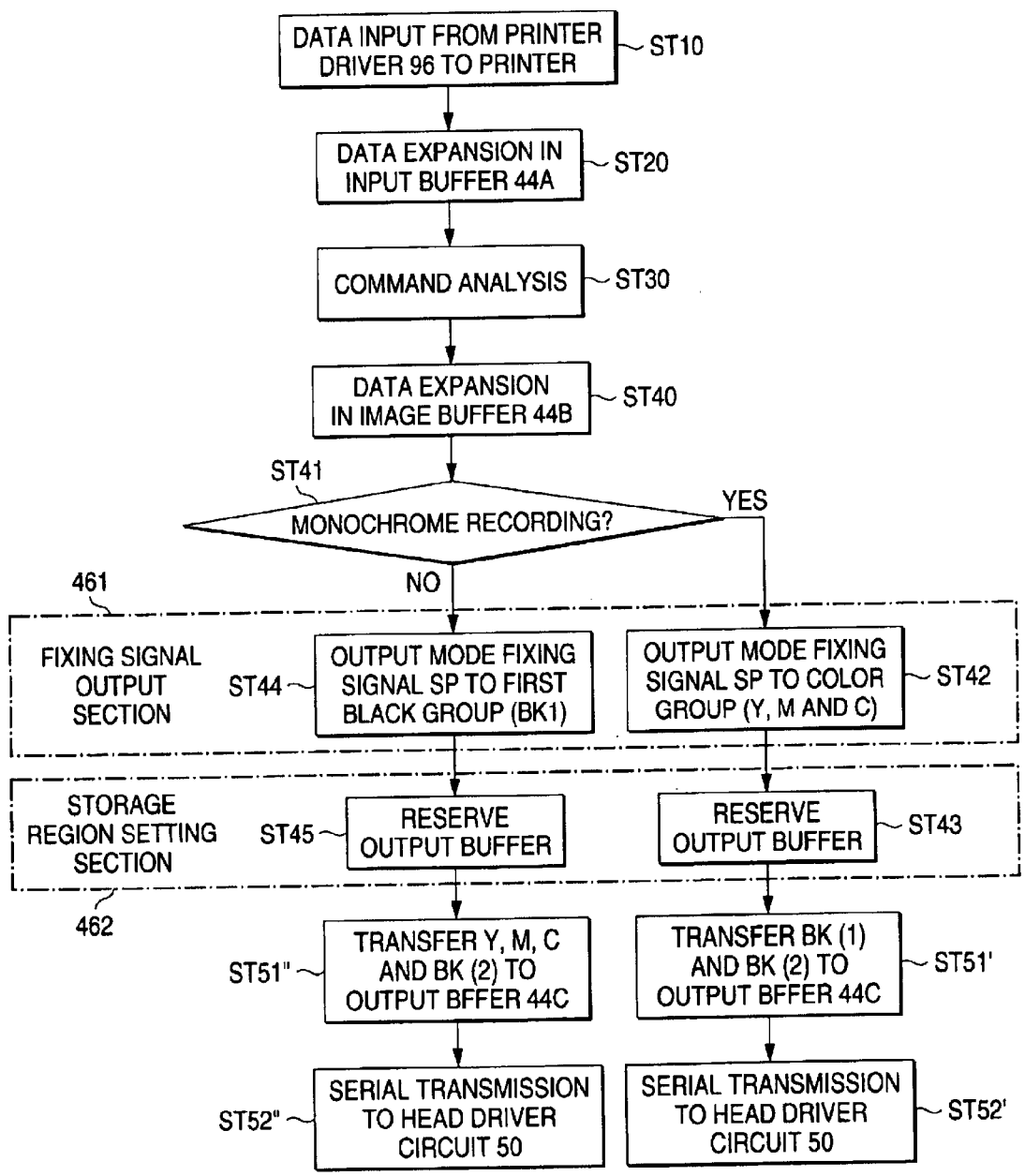
FIG. 8 is a flowchart to describe processing of fixing ink jetting in the nozzle orifices belonging to a specific group off in the ink jet printer shown in FIG. 3.
Figure 9:
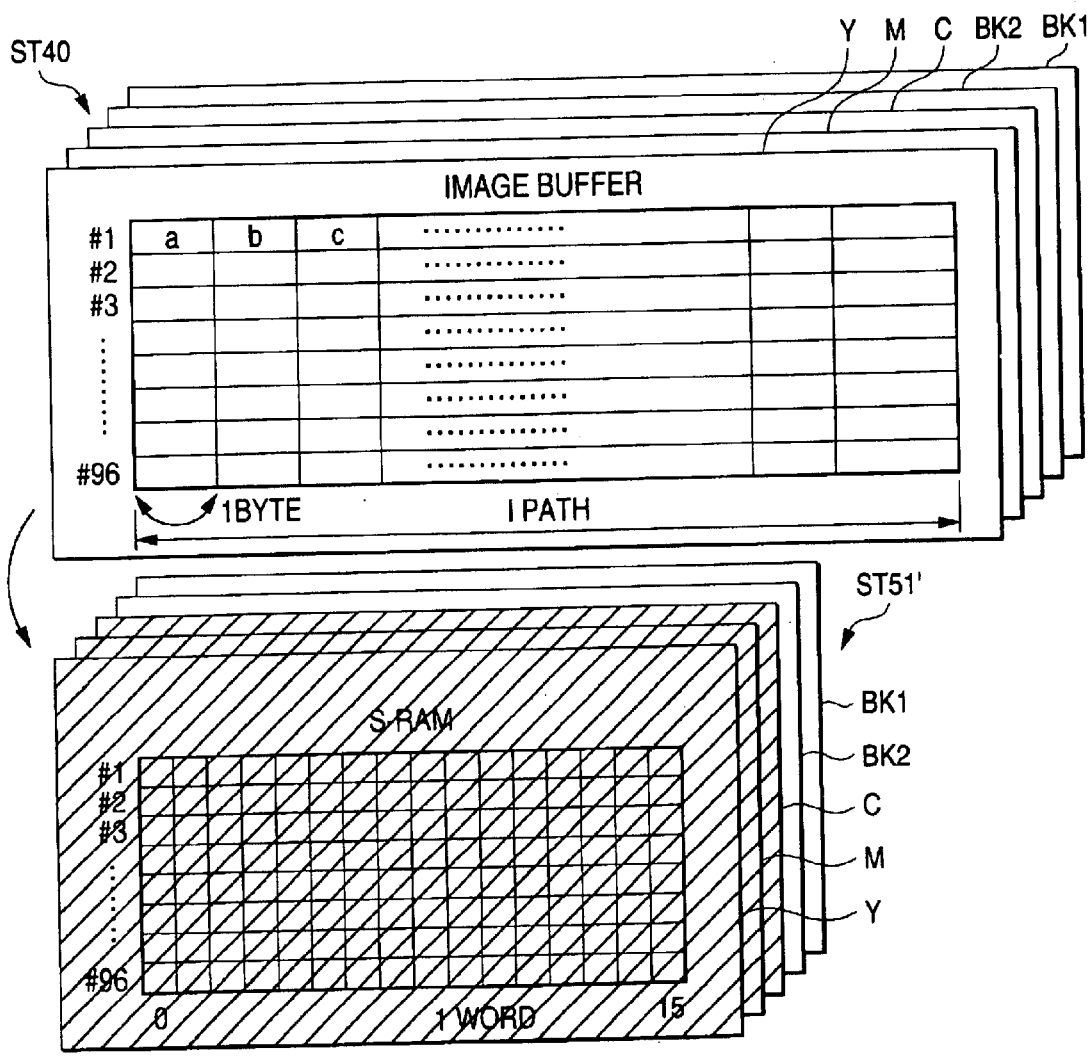
FIG. 9 is a schematic representation to show a state in which serial conversion and serial transfer of record data are stopped in an output buffer for three color groups with the mode fixed on the monochrome recording in the ink jet recording apparatus shown in FIG. 1.
Figure 10:
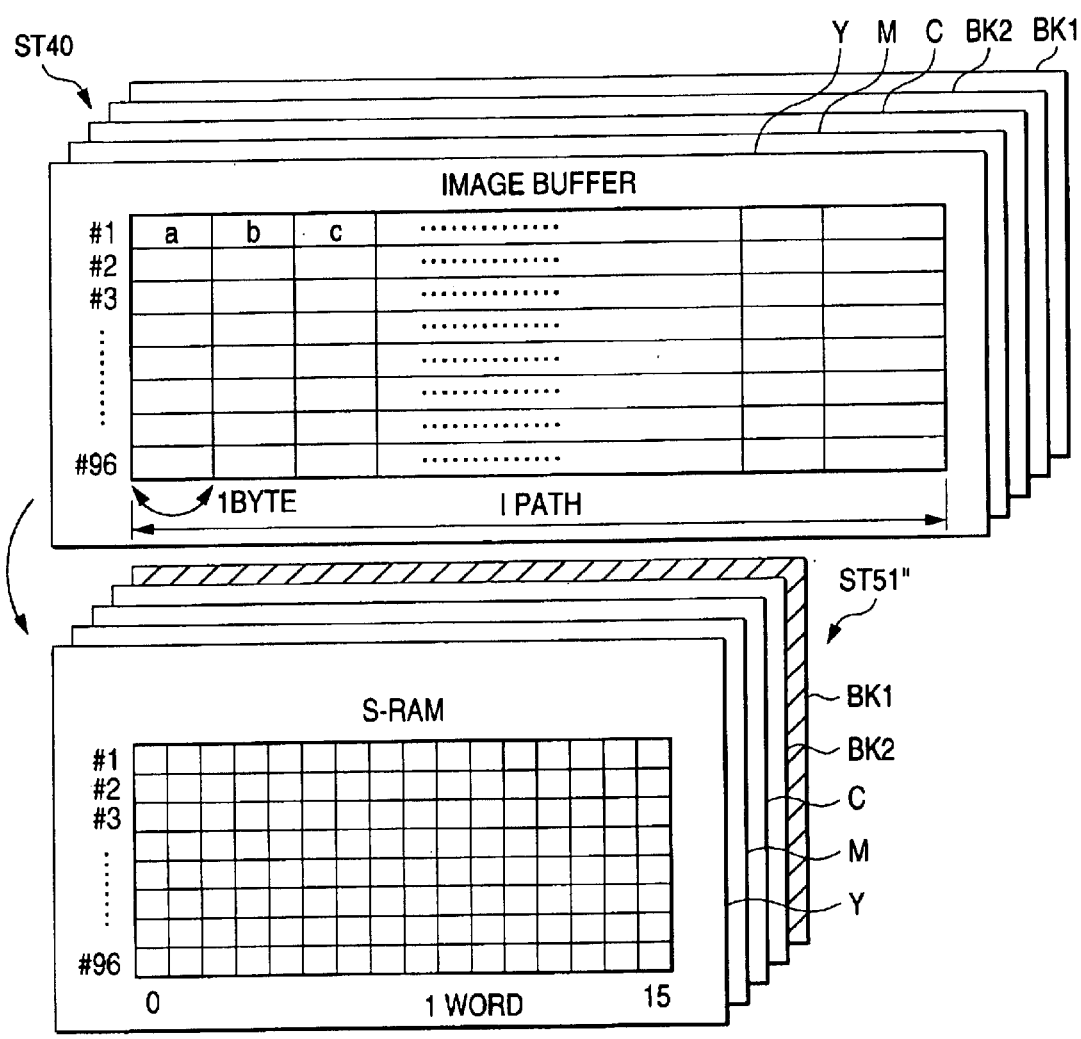
FIG. 10 is a schematic representation to show a state in which serial conversion and serial transfer of record data are stopped in the output buffer for the first black group of two black groups with the mode fixed on the color recording in the ink jet recording apparatus shown in FIG. 1.

The contents of such control will be discussed with reference to FIGS. 8 to 10. FIG. 8 is a flowchart to describe processing of fixing ink jetting in the nozzle orifices belonging to a specific group off. FIG. 9 is a schematic representation to show a state in which serial conversion and serial transfer of the record data SI are stopped in the output buffer 44C in the three color groups (Y, M, and C) with the mode fixed on the monochrome recording in the ink jet recording apparatus shown in FIG. 1. FIG. 10 is a schematic representation to show a state in which serial conversion and serial transfer of the record data SI are stopped in the output buffer 44C in the first black group (BK1) with the mode fixed on the color recording in the ink jet recording apparatus shown in FIG. 1.

In FIG. 8, in the embodiment, as previously described with reference to FIG. 6, one-page record information created with the printer driver 96 installed in the personal computer is input to the printer 100 via various interfaces 85, 43 (step ST10). Then, the record information is stored as data in the input buffer 44A formed in the DRAM (step ST20). Next, the control section 46 (CPU) executes command analysis on the data stored in the input buffer 44A one byte at a time (step ST30) and then transfers the record information to the image buffer 44B in the DRAM as image data (step ST40).

Next, at step ST41, whether or not the current record mode is monochrome is determined. If monochrome recording is applied, the fixing signal output section 461 of the control section 46 outputs a signal indicating that the jetting mode is fixed to the non-jetting mode to the head driver circuit 50 as the mode fixing signal SP for the three color groups of cyan (C), magenta (M), and yellow (Y) not used for recording (step ST42) and then, as shown in FIG. 9, the storage regions for the two groups of the first black group (BK1) and the second black group (BK2) required for monochrome recording are reserved in the output buffer 44C (step ST43). Next, at step ST51', serial conversion of the record data SI in the output buffer 44C is executed only for the two groups of the first black group (BK1) and the second black group (BK2) used on the monochrome recording, and the two-group record data SI is transferred to the head driver circuit (step ST52').

In contrast, if it is determined that the current record mode is color, the fixing signal output section 461 of the control section 46 outputs a signal indicating that the jetting mode is fixed to the non-jetting mode to the head driver circuit 50 as the mode fixing signal SP for the first black group (BK1) not used for recording (step ST44) and then, as shown in FIG. 10, the storage regions for the four groups of the three color groups (Y, M, and C) and the second black group (BK2) required for color recording are reserved in the output buffer 44C (step ST45). Next, at step ST51', serial conversion of the record data SI in the output buffer 44C is executed only for the three color groups (Y, M, and C) and the second black group (BK2) used on the color recording, and the two-group record data SI is transferred to the head driver circuit (step ST52').

Thus, in the ink jet recording apparatus 1 of the embodiment, the fixing signal output section 461 outputs a signal indicating that no ink drop is jetted to the head driver circuit 50 as the mode fixing signal SP for the nozzle orifices 111 belonging to the group not used for recording and the mode fixing circuit 18 of the head driver circuit 50 fixes the nozzle orifices 111 belonging to the corresponding group to the condition of jetting no ink drops based on the mode fixing signal SP. Therefore, the fixing signal output section 461 simply outputs the mode fixing signal SP for the group of jetting no ink drops in all nozzle orifices 111, whereby the mode fixing circuit 18 fixes the drive condition in hardware assuming that no ink drops are jetted from the nozzle orifices 111 belonging to the group. Thus, serial conversion and serial transfer of the data indicating that no ink is jetted ("0" data) as the record data SI need not be executed for the group of jetting no ink drops, so that fruitless processing time can be eliminated.

That is, as the areas not used for conversion of the record data SI are hatched to distinguish from other areas in the output buffer 44C in FIGS. 9 and 10, when monochrome recording is executed, processing is performed only with the areas of the output buffer 44C for two groups; when color recording is executed, processing is performed only with the areas of the output buffer 44C for four groups. Therefore, unlike the case where serial transfer of data is performed for all groups, fruitless data processing time and fruitless data transfer time can be eliminated, so that the throughput of recording can be enhanced.

In the above-described embodiment, as the output buffer 44C, the storage regions for the five groups are reserved as the storage regions for the four groups (as many as the maximum number of groups) having a possibility that they will be used at the same time or more, and the control section 46 reserves the storage regions for the two groups or four groups in the output buffer 44C depending on monochrome or color recording. However, as shown in FIGS. 11 and 12, as the output buffer 44C, only the storage regions for the four groups (as many as the maximum number of groups) having a possibility that they will be used at the same time is reserved, and the control section 46 may allocate each of the storage regions for the four groups to the monochrome or color area depending on monochrome or color recording.

Figure 11:
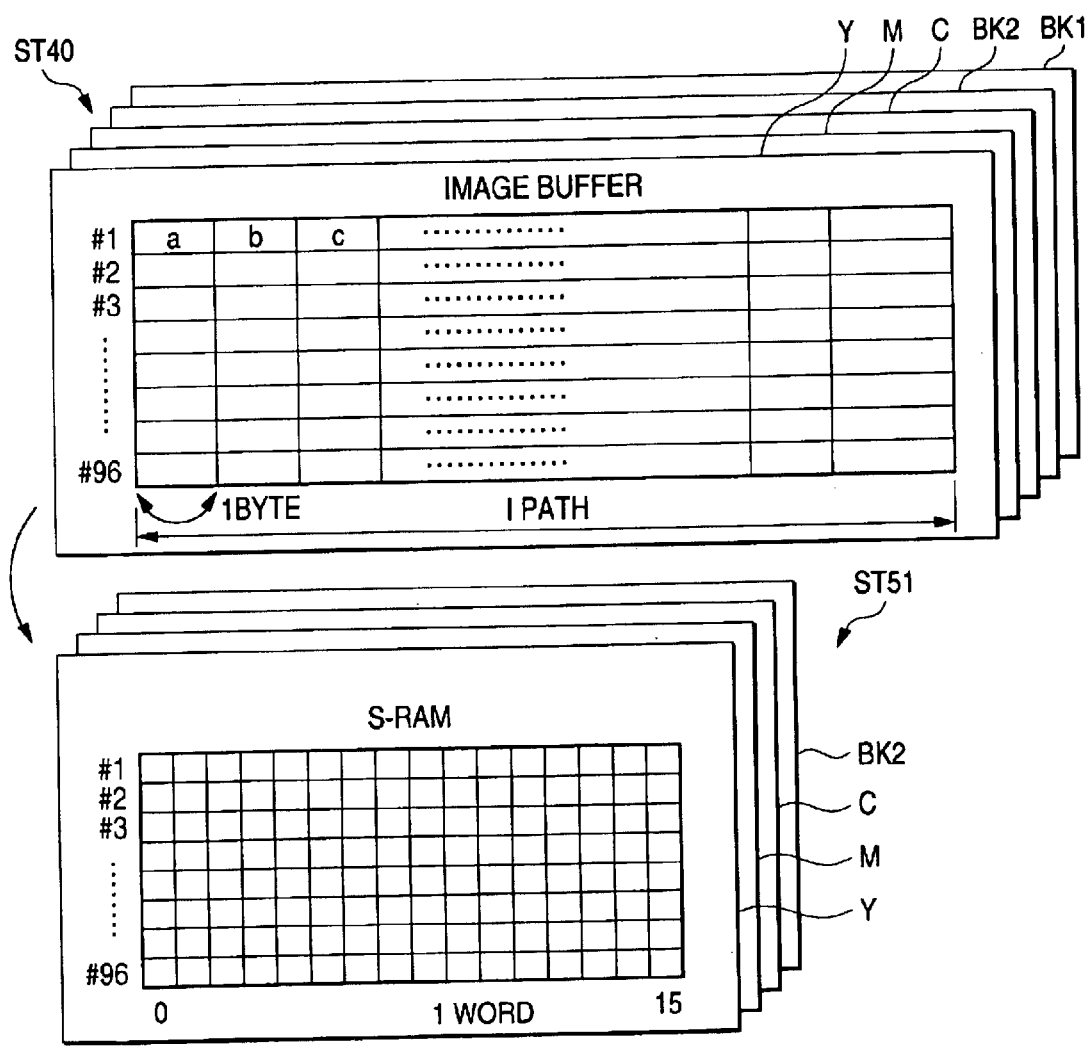
FIG. 11 is a schematic representation to show another state in which serial conversion and serial transfer of record data are stopped in the output buffer for the first black group of two black groups with the mode fixed on the color recording in the ink jet recording apparatus shown in FIG. 1.
Figure 12:
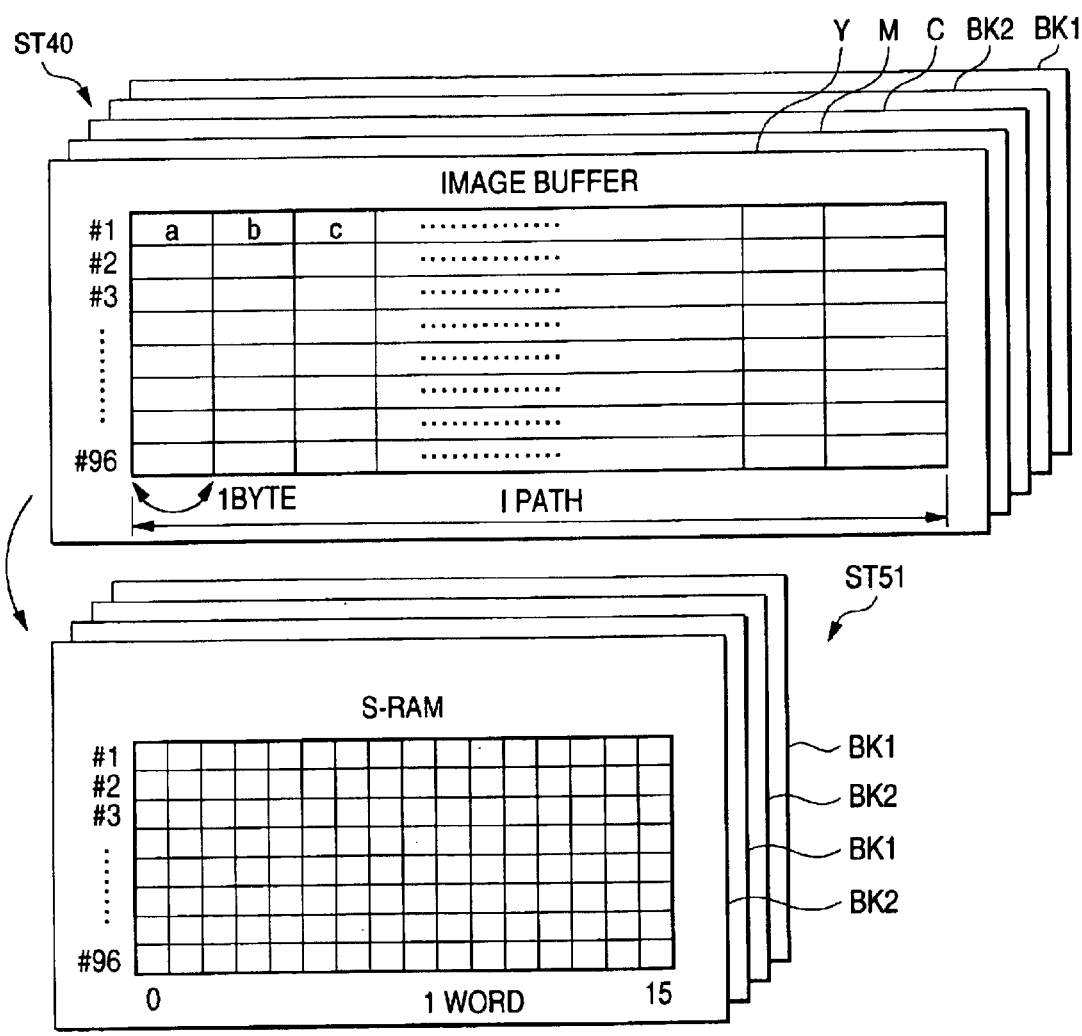
FIG. 12 is a schematic representation to show another state in which serial conversion and serial transfer of record data are stopped in the output buffer for three color groups with the mode fixed on the monochrome recording in the ink jet recording apparatus shown in FIG. 1.

In this case, to execute color recording, as shown in FIG. 11, the storage regions for the four groups of the three color groups (Y, M, and C) and the second black group (BK2) are reserved in the output buffer 44C.

In contrast, to execute monochrome recording, the storage regions for the first and second black groups (BK1 and BK2) are reserved in the output buffer 44C; in the invention, the record operation in the three color groups (Y, M, and C) is controlled by the mode fixing signal SP and no storage region is required for the color groups (Y, M, C). Then, as shown in FIG. 12, when the mode fixing signal SP is output and record data transfer becomes unnecessary and thus excess storage regions occur in the output buffer 44C, the excess storage regions may be used as storage regions for the first and second black groups (BK1 and BK2). That is, to execute monochrome recording, the storage regions for the first and second black groups (BK1 and BK2) may be reserved as two areas for each group.

When the mode fixing signal SP is output and record data transfer becomes unnecessary and thus an excess storage region occurs in the output buffer 44C, the excess storage region may be used for any other data processing, such as a communication buffer.

Figure 13:
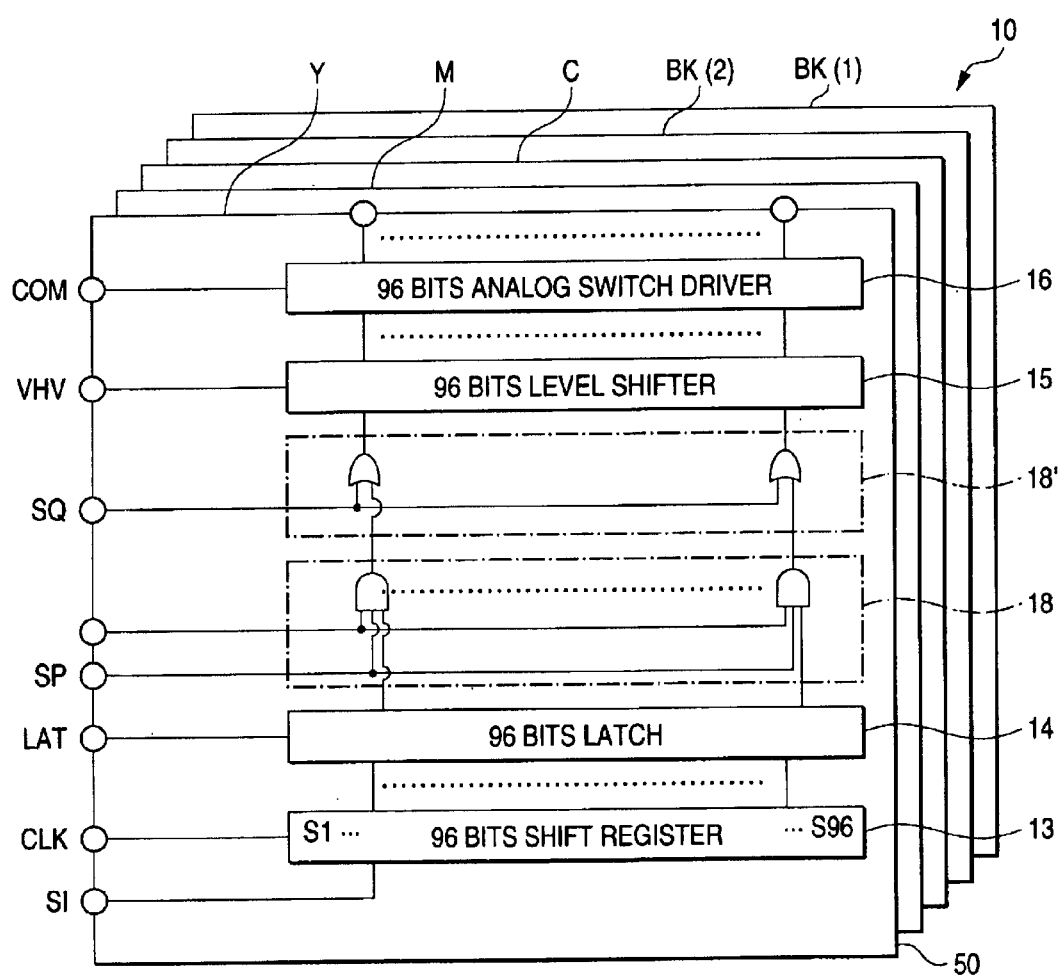
FIG. 13 is a block diagram to show a configuration wherein a mode fixing circuit for jetting ink drops from all nozzle orifices with the mode fixed is added to the head driver circuit of the ink jet recording apparatus shown in FIG. 1.

Here, as shown in FIGS. 11 and 12, if the output buffer 44C has storage regions only for four groups although five groups of nozzle orifices 111 exist, the flushing operation cannot be performed under the control using the record data SI. In such a case, the fixing signal output section 461 shown in FIG. 5 may output the mode fixing signal SP indicating that no ink drop is jetted for the nozzle orifices 111 belonging to the group not used for recording and may output a mode fixing signal SQ indicating that ink drops are jetted from the nozzle orifices 111 belonging to all groups to the head driver circuit 50 and a second mode fixing circuit 18' for fixing the ink jet condition to the condition defined by the mode fixing signal SQ for all nozzle orifices 111 may be added to the head driver circuit 50 as shown in FIG. 13. In the example shown in FIG. 13, an OR gate circuit to which output of the AND gate used with the mode fixing circuit 18 mentioned above and the mode fixing signal SQ for jetting ink drops from all nozzle orifices are input is used as the mode fixing circuit 18' for jetting ink drops from all nozzle orifices.

Further, in the above-mentioned embodiment, the mode fixing circuits 18 and 18' are placed at midpoints of the signal transfer path connecting the latch circuit 14 and the level shifter 15, but may be placed between the shift register 13 and the latch circuit 14 if they are placed at the stage following the shift register 13.

Further, in the above-mentioned embodiment, the mode fixing circuits 18 and 18' are placed at the stage following the shift register 13, but may be placed at the stage preceding the shift register 13 on the side of the print controller 40 or the recording head 10. In this case, when the mode fixing signal SP, SQ is output, the mode fixing circuit 18, 18' causes the shift register 13 to hold the data defined by the mode fixing signal SP, SQ (data "0" indicating that ink drop jetting is stopped or data "1" indicating that an ink drop is jetted).

Further, in the above-mentioned embodiment, the SP signal is input from the I/F 49 to the mode fixing circuit 18, but a command analysis section may be provided at the stage preceding the shift register and a control command together with print data may be sent from the I/F 49, then the command analysis section may analyze the control command and if the command is a mode fixing command, the command analysis section may output a signal to the mode fixing circuit 18 for operating the mode fixing circuit 18.

In this case, the need for placing the signal line SP outside the head driver circuit 50 is eliminated and the number of signal lines input to the head driver circuit 50 can be decreased.

Further, in the above-mentioned embodiment, the recording head 10 is formed with the five rows, five groups of nozzle orifices, namely, the nozzle orifices belonging to the three color groups for jetting three color inks of cyan (C), magenta (M), and yellow (Y), the nozzle orifices belonging to the first black group (BK1) for jetting black ink on the monochrome recording and stopping jetting ink drops on the color recording, and the nozzle orifices belonging to the second black group (BK2) for jetting black ink on the color recording and on the monochrome recording. However, for example, the invention may be applied to an ink jet recording apparatus comprising a recording head 10 formed with six rows, five groups of nozzle orifices, namely, three rows of nozzle orifices belonging to three color groups for jetting three color inks of cyan (C), magenta (M), and yellow (Y) (one row per color), two rows of nozzle orifices belonging to a first black group (BK1) for jetting black ink on the monochrome recording and stopping jetting ink drops on the color recording, and one row of nozzle orifices belonging to a second black group (BK2) for jetting black ink on the color recording and on the monochrome recording.

Further, in the above-mentioned embodiment, the head formed with the nozzles grouped for each row as shown in FIG. 4 is used, but the nozzles making up one row may be grouped in a longitudinal direction. For example, one row of black ink nozzle orifices is divided into three groups in the longitudinal direction and in the monochrome mode, all three groups can be used for recording and in the color mode, only one group can be used for recording and the remaining two groups can be fixed to a non-jetting mode by a mode fixing signal.

Further, in the above-mentioned embodiment, the ink jet recording apparatus using piezoelectric vibrators as the pressure generating elements is taken as an example, but the invention can also be applied to an ink jet recording apparatus for generating pressure in pressure generating chambers by heating, and further to serial printers of impact dot type, thermal transfer type, etc., page printers of laser type, thermal transfer type, etc., and the like.

As described above, in the recording apparatus of the invention, hardware drive control with the mode fixing signal rather than drive control with the record data is performed for the group wherein the presence or absence of dot formation is fixed in all dot formation means belonging to the same group. Thus, serial conversion to the record data in the output buffer and serial transfer of the record data to the head driver circuit formerly performed also for the data indicating that no ink is jetted ("0" data) become unnecessary for the group subjected to drive control by the mode fixing signal, so that fruitless processing time can be eliminated. Therefore, as compared with the case where serial conversion to the record data and serial transfer of the record data to the head driver circuit are performed for all groups, fruitless data processing time and fruitless data transfer time can be eliminated, so that the throughput of recording can be enhanced.

What is claimed is:

1. A recording apparatus comprising:
   dot formation means being divided into a plurality of groups, each of the groups for forming a dot;
   drive means for driving the respective groups in the dot formation means in accordance with record data;
   fixing signal output means for outputting a fixing signal, to the drive means, instead of the record data, wherein the fixing signal selects at least one group in the dot formation means so that the selected group is not used for forming the dot in accordance with the record data;
   fixing means for setting the selected group so as not to form the dot in response to the fixing signal and
   control means for transferring the record data to the group except for the group selected by the fixing signal.

2. The recording apparatus as set forth in claim 1, wherein:
   the dot formation means is divided into the plurality of groups in accordance with a predetermined dot formation condition assigned thereto, the dot formation condition being related to monochrome recording or color recording;
   the fixing signal selects the group in the dot forming means in accordance with the monochrome recording or the color recording; and
   the control means expands record information into an image in storage means for transferring the record data from the storage means to the drive means.

3. The recording apparatus as set forth in claim 2, wherein the storage means is provided with storage regions enough for a maximum number of groups of the dot formation means which are used at the same time; and wherein the control means reserves storage regions in the storage means enough for groups used on a present recording.

4. The recording apparatus as set forth in claim 2, wherein the storage means is provided with storage regions only enough for a maximum number of groups of the dot formation means which are used at the same time.

5. The recording apparatus as set forth in claim 2, wherein when an excess storage region occurs in the storage means in accordance with unnecessity of the record data transmission due to the fixing signal output, the control means utilizes the excess storage region for a serial transmission of the record data.

6. The recording apparatus as set forth in claim 2, wherein when an excess storage region occurs in the storage means in accordance with unnecessity of the record data transmission due to the fixing signal output, the control means utilizes the excess storage region for another data processing.

7. The recording apparatus as set forth in claim 2, wherein the divided groups of the dot formation means includes a color group for forming a plurality colors of dots, a first black group (or forming a black dot on the monochrome recording and a second black group for firming a black dot on tho monochrome recording and the color recording; and wherein the fixing signal output means outputs the fixing signal to the first black group on the color recording, and outputs the fixing signal to the color group on the monochrome recording.

8. The recording apparatus as set forth in claim 2, wherein a drive signal is provided with a shift register for parallel-converting the record data whioh is serial-transmitted; and wherein the fixing means is provided on a signal transmission path arranged between the shift register and the dot formation means.

9. The recording apparatus as set forth in claim 2, wherein a drive signal is provided with a shift register for parallel-converting the record data which is serial-transmitted; and wherein the fixing means keeps data determined by the fixing signal in the shift register.

10. The recording apparatus as set forth in claim 1, wherein the divided groups of the dot formation means further comprise a color group for forming a plurality colors of dots, a first black group for forming a black dot during monochrome recording and a second black group for forming a black dot during the monochrome recording and the color recording; and wherein the fixing signal output means outputs the mode fixing signal to the first black group during the color recording, and outputs the mode fixing signal to the color group during the monochrome recording.

11. The recording apparatus as set forth in claim 1, wherein:
    the drive means includes a plurality of switching members corresponding to the groups in the dot forming means; and
    the switching members corresponding to the selected group are turned off so that a drive signal supplied to the drive means is shut off.

12. A method of controlling data, comprising the steps of:
    providing a recording apparatus comprising:
       dot formation means being divided into a plurality of groups, each of the groups for forming a dot;
       drive means for driving the respective groups in the dot formation means in accordance with record data; and
       control means for transferring the record data to the group in the dot formation means;
    outputting a fixing signal to the drive means, instead of the record data, the fixing signal selecting at least one group in the dot formation means which is not used for forming the dot in accordance with the record data;
    fixing the selected group so as not to form the dot; and
    transferring the record data to the group except for the group selected by the fixing signal.

13. The data controlling method as set forth in claim 12, further comprising the step of reserving a storage region in a storage means associated only with the group to which the fixing signal is transmitted.

14. A recording apparatus comprising:
    dot formation means being divided into a plurality of groups, each of the groups for forming a dot in accordance with a predetermined dot formation condition;
    drive means including a mode fixing circuit, for driving the respective groups in the dot formation means in accordance with record data;
    storage means including storage regions, for storing only the groups used in the dot formation;
    control means for expanding record information into an image in the storage means, for transferring record data from the storage means to the drive means and for reserving storage regions in the storage means only for groups used on a present recording; and fixing signal output means for outputting a fixing signal, the fixing signal determining at least one group in the dot formation means which is not used for forming the dot in accordance with the dot formation condition in the mode fixing circuit, and for transmitting the fixing signal directly to the drive means instead of the record data;

wherein the control means transfers the record data to the group except for the group selected by the fixing signal.

15. The recording apparatus as set forth in claim 14, further comprising mode fixing means for fixing the dot formation condition of the group in the dot formation means.

16. The recording apparatus as set forth in claim 14, wherein:

the dot formation condition is related to monochrome recording or color recording;

the divided groups of the dot formation means further comprise a color group for forming a plurality colon of dots, a first black group for forming a black dot during monochrome recording and a second black group for forming a black dot during the monochrome recording and the color recording; and the fixing signal output means outputs the mode fixing signal to the first black group during the color recording, and outputs the mode fixing signal to the color group during the monochrome recording.

17. A recording apparatus comprising:

dot formation means being divided into a plurality of groups for forming a dot in accordance with a predetermined dot formation condition related to monochrome or color recording;

driving means for driving the respective groups in the dot formation means and for determining the formation of the dot by inputting into the dot formation condition a mode fixing signal; and control means for expanding image in storage means corresponding to the data used for dot formation and for transferring data from storage to drive means, control means for transferring the data to the groups except for the group selected by the fixing signal;

wherein the divided groups of the dot formation means further comprise:

a color group for forming a plurality colors of dots only during the color recording, a first black group for forming a black dot only during monochrome recording, and a second black group for forming a black dot during the monochrome recording and during the color recording.

18. The recording apparatus as set forth in claim 17, wherein the mode fixing signal is transmitted to the first black group during the color recording, and the mode fixing signal is transmitted to the color group during the monochrome recording.

19. A recording apparatus, comprising:

dot formation means being divided into a plurality of groups, each of the groups for forming a dot;

drive means for driving the respective groups in the dot formation means in accordance with record data;

fixing signal output means for outputting a fixing signal to the drive means, instead of the record data, and the fixing signal selecting all the groups in the dot formation means in accordance with the record data so that the respective groups form the dot;

fixing means for fixing all the groups so as to form the dot; and control means for transferring the record data to the groups except for the groups selected by the fixing signal.

20. A method of controlling data, comprising:

providing a recording apparatus comprising:

dot formation means divided into a plurality of groups, each group being for forming a dot, drive means for driving the respective groups in the dot formation means in accordance with record data, and control means for transferring the record data to the groups in the dot formation means;

outputting a fixing signal to the drive means, instead of the record data, the fixing signal selecting all the groups in the dot formation means in accordance with the record data;

fixing all the groups so as to form the dot; and transferring the record data to the groups except for the groups selected by the fixing signal.

21. A recording apparatus, comprising:

a dot formation unit, having a plurality of dot forming groups, each of the dot forming groups having a dot-forming capability;

a drive unit, driving the respective dot forming groups in the dot formation unit so as to form the dot in accordance with record data;

a fixing signal generator, outputting a fixing signal to the drive unit, instead of the record data, wherein the fixing signal select at least one dot forming group in the dot formation unit;

a setting unit, setting the selected dot forming group so as not to form the dot, in accordance with the fixing signal; and control means for transferring the record data to the groups except for the group selected by the fixing signal.

* * * * *